UNITED STATES PATENT OFFICE.

WILHELM TRAUBE, OF BERLIN, GERMANY, ASSIGNOR TO SYNTHETIC PATENTS CO., INC., OF NEW YORK, N. Y., A CORPORATION OF NEW YORK.

PROCESS FOR PRODUCING ETHYLENE FROM ACETYLENE.

1,179,051. Specification of Letters Patent. Patented Apr. 11, 1916.

No Drawing. Application filed December 1, 1915. Serial No. 64,528.

*To all whom it may concern:*

Be it known that I, WILHELM TRAUBE, doctor of philosophy, professor of chemistry, citizen of the German Empire, residing at Berlin, Germany, have invented new and useful Improvements in Processes for Producing Ethylene from Acetylene, of which the following is a specification.

My invention relates to an improvement in the manufacture and production of ethylene from acetylene with the aid of chromium.

The process consists in reducing in an acid medium acetylene by means of chromous salts. The chromous salt is produced in the mixture of the reaction in a theoretically insufficient quantity, during the process the chromous salt being always regenerated from the chromic salt which has been formed. By a theoretically insufficient quantity is meant a proportion of a chromous salt based on the weight of acetylene which is less than two molecules of the chromous salt to one molecule of the acetylene.

In order to illustrate the new process more fully the following example is given, the parts being by weight:

Example: In a vessel containing about 4 parts of chromic chlorid ($CrCl_3 + 6H_2O$) and 20 parts of a 25 per cent. hydrochloric acid and 4 parts of zinc, .4 parts of acetylene, all parts being by weight, (400 cubic centimeters acetylene (about 0.4 grams) on about 4 grams $CrCl_3 + 6H_2O$) are pressed while the mixture is being well stirred. The reaction may be carried out at the ordinary pressure and temperature. When the reaction is complete the resulting mixture of ethylene and hydrogen is separated in the known manner. The small quantity of chromous chlorid $CrCl_2$ which has arisen converts part of the acetylene into ethylene. The chromic chlorid regenerated is immediately converted into chromous chlorid which acts anew upon another part of acetylene. The oxidation and reduction of the chromium salts succeed so quickly that the reduction is completed in a short time. Other chromic salts may be used. The ethylene so produced is so free from impurities and other hydrocarbons that it may advantageously be used for the production of chlor-ethylene and ethylene chlorids.

I claim:

1. The herein described process of producing ethylene from acetylene, which comprises bringing acetylene into contact with a theoretically insufficient quantity of a chromous salt while said chromous salt is regenerated during the process from the chromic salt formed, substantially as described.

2. The herein described process of producing ethylene from acetylene, which comprises bringing acetylene into contact with a theoretically insufficient quantity of chromous chlorid while the chromous chlorid is regenerated during the process from the chromic chlorid formed, substantially as described.

3. The herein described process of producing ethylene which comprises contacting acetylene with an acid solution to which a chromic salt and a metal capable of reacting with the acid to produce hydrogen have been added, substantially as described.

4. The herein described process of producing ethylene which comprises intimately mixing acetylene with an acid solution containing a metal capable of reacting with the acid to produce hydrogen and an amount of a chromic salt capable of furnishing during the reaction a quantity of the corresponding chromous salt which by itself would be theoretically insufficient to effect the reduction of all of the acetylene, substantially as described.

5. The herein described process of producing ethylene which comprises intimately mixing acetylene under pressure with hydrochloric acid to which chromic chlorid and zinc have been added, substantially as described.

In testimony whereof I have hereunto set my hand in the presence of two subscribing witnesses.

PROF. DR. WILHELM TRAUBE.

Witnesses:
HENRY HASPER,
ARTHUR SCHROEDER.